United States Patent

Richard

[11] Patent Number: 5,498,347
[45] Date of Patent: Mar. 12, 1996

[54] REACTOR FOR THE OZONIZATION OF WATER

[75] Inventor: Yves R. Richard, Marly le Roi, France

[73] Assignee: Degremont, Rueil Malmaison Cedex, France

[21] Appl. No.: 377,684

[22] Filed: Jan. 25, 1995

Related U.S. Application Data

[63] Continuation of Ser. No. 174,360, Dec. 28, 1993, abandoned.

[30] Foreign Application Priority Data

Dec. 28, 1992 [FR] France .................................. 92 15787

[51] Int. Cl.$^6$ .............................. C02F 1/72; C02F 1/78
[52] U.S. Cl. .......................... 210/739; 210/759; 210/760; 210/764; 210/96.1; 210/98; 210/101; 210/105; 210/143; 210/192; 210/199; 210/259
[58] Field of Search .................................. 210/764, 760, 210/758, 759, 199, 192, 259, 96.1, 98, 739, 143, 103, 105, 101

[56] References Cited

U.S. PATENT DOCUMENTS

| | | | |
|---|---|---|---|
| 3,816,306 | 6/1974 | Roy | 210/49 |
| 4,029,578 | 6/1977 | Turk | 210/760 |
| 4,104,166 | 8/1978 | LaRaus | 210/259 |
| 4,416,786 | 11/1983 | Knorre et al. | 210/746 |
| 4,648,978 | 3/1987 | Makinen et al. | 210/760 |
| 4,696,739 | 9/1987 | Pedneault | 210/121 |
| 4,780,287 | 10/1988 | Zeff et al. | 422/186.3 |
| 4,792,407 | 12/1988 | Zeff et al. | 210/760 |
| 4,915,849 | 4/1990 | Griffiths et al. | 210/759 |
| 4,990,316 | 2/1991 | Duguet | 210/760 |
| 5,004,537 | 4/1991 | Brown | 210/192 |
| 5,051,191 | 9/1991 | Rasmussen et al. | 210/721 |
| 5,053,140 | 10/1991 | Hurst | 210/704 |
| 5,082,558 | 1/1992 | Burris | 210/167 |
| 5,252,300 | 10/1993 | Hinchliffe | 422/186.08 |
| 5,273,664 | 12/1993 | Schulz | 210/760 |
| 5,364,537 | 11/1994 | Paillard | 210/743 |

FOREIGN PATENT DOCUMENTS

| | | |
|---|---|---|
| 0549413A1 | 6/1993 | European Pat. Off. . |
| 2563208 | 10/1985 | France . |
| 3921436A1 | 1/1991 | Germany . |

OTHER PUBLICATIONS

Patent Abstracts of Japan—JP551449688, vol. 5, No. 24, Feb. 13, 1981.
Patent Abstracts of Japan—JP57019088, vol. 6, No. 90, May 27, 1982.
Patent Abstracts of Japan—JP58055088, vol. 7, No. 143, Jun. 22, 1983.

*Primary Examiner*—Cynthia L. Nessler
*Attorney, Agent, or Firm*—Pollock, Vande Sande & Priddy

[57] ABSTRACT

Reactor for the optimized ozonization of water intended for human consumption, in which the direct oxidizing action of the ozone is supplemented by the radical oxidizing action of the ozone, the latter being intensified by the introduction of hydrogen peroxide, characterized in that it comprises three contact tanks arranged in series: a first contact tank receiving the water to be treated and intended for the direct and rapid oxidizing action by the ozone which is introduced into the said tank and brought into contact with the liquid to be treated; a second contact tank intended to ensure the disinfection of the liquid and into which is injected the quantity of ozone necessary to maintain in the liquid to be treated the residual ozone concentration necessary for the disinfection of the water; and a third contact tank intended to ensure the radical action of the ozone, into which there is injected, besides the ozone, a quantity of hydrogen peroxide intended to increase the quantity of OH radicals available for the reaction with the pollutants to be removed by oxidation, the treated water being discharged from this third tank.

2 Claims, 1 Drawing Sheet

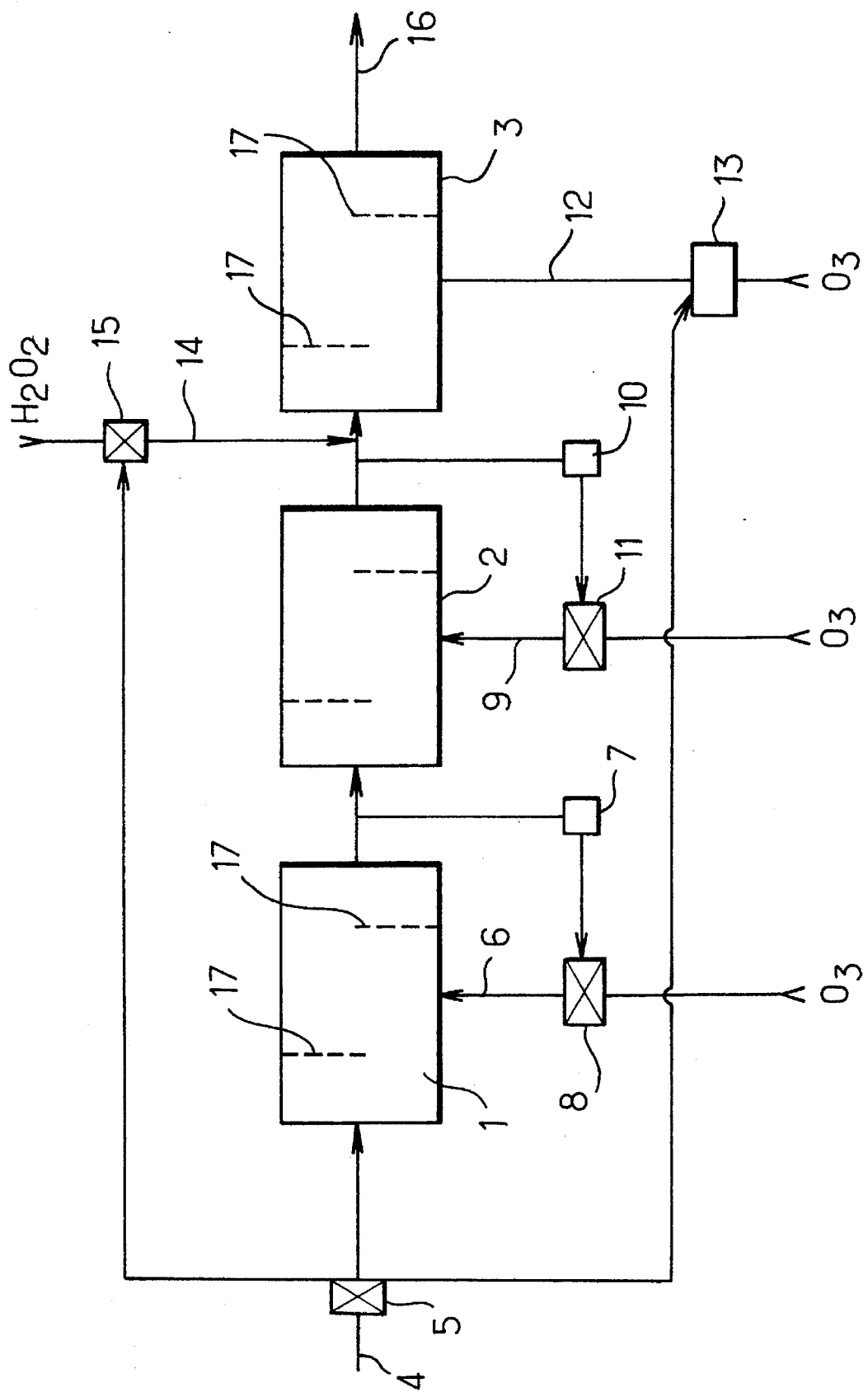

REACTOR FOR THE OZONIZATION OF WATER

This application is a continuation of U.S. patent application Ser. No. 08/174,360, filed Dec. 28, 1993, now abandoned.

FIELD OF THE INVENTION

The present invention relates to an improved reactor intended to ensure an optimization of the ozonization of water intended especially for human consumption.

BACKGROUND OF THE INVENTION

At the present time the ozonization process which ensures the disinfection of water is applied with the aid of two contact vessels or tanks which are arranged in series. The purpose of the first contact tank is to respond to the chemical demand of the water for ozone and to establish a predetermined ozone content (C), for example 0.4 mg/l, at the entry of the second contact tank. The purpose of the second contact tank is to make it possible to maintain the ozone content established at the entry for a time (T) necessary to obtain the disinfection conditions which it is desired to apply (C×T= a required value).

Recent investigations carried out into the action of ozone as an oxidizing agent have revealed two actions of ozone: direct oxidation and radical oxidation. In this connection reference may be made to the French certificate of addition 8817134 (U.S. Pat. No. 2,640,957). Furthermore, modern means of analysis have made it possible to investigate the oxidation kinetics and to demonstrate two types of reaction kinetics: fast reactions which take place with short reaction times, measured in a second, and slow reactions which take place with long reaction times, measured in minutes.

It is known that the radical action can be intensified by introducing a promoter for the production of OH radical, for example hydrogen peroxide, ultraviolet radiation etc. (a process called "Pérozone" developed and improved by the companies Lyonnaise des Eaux Dumez and Degrémont). The hydrogen peroxide is generally introduced either at the head of the two contact tanks or at a point situated between the two tanks.

Operating in this manner has the disadvantage that the hydrogen peroxide reacts with the ozone in the water, making it disappear. As a result of this it is impossible to implement the control of the quantity of ozone to be produced and injected into the two contact tanks respectively, this control being conventionally performed by measuring the ozone in the water while at the same time taking into account the variations in the flow rate being treated and in the quality of the water to be treated.

The present invention proposes to optimize the ozone injections as a function of all the abovementioned factors, while eliminating the disadvantages of the previous solutions emphasized above.

The subject of the invention is therefore a reactor for the optimized ozonation of water intended for human consumption, in which the direct oxidizing action of the ozone is supplemented by the radical oxidizing action of the ozone, the latter being intensified by the introduction of hydrogen peroxide, characterized in that it comprises three contact tanks arranged in series:

a first contact tank receiving the water to be treated and intended for the direct and rapid oxidizing action by the ozone which is introduced into the said tank and brought into contact with the liquid to be treated;

a second contact tank intended to ensure the disinfection of the liquid and into which is injected the quantity of ozone necessary to maintain in the liquid to be treated the ozone concentration necessary for the disinfection of the water; and a third contact tank intended to ensure the radical action of the ozone, into which there is injected, besides the ozone, a quantity of hydrogen peroxide intended to increase the quantity of OH radicals available for the reaction with the pollutants to be removed by oxidation, the treated water being discharged from this third tank.

According to the present invention the first contact tank is provided with a regulating system making it possible to control the quantity of ozone to be injected into this tank by measuring the ozone concentration in the liquid to be treated which is necessary for the disinfection, this measurement being performed with the aid of a sensor positioned at the exit of the said first tank.

According to a characteristic of the present invention, the second contact tank comprises a system for controlling the quantity of ozone to be injected into this tank, this control being carried out by measuring the ozone at the exit of this tank with the aid of a sensor, the contact time (T) in the said second tank being determined so that the product of ozone content (C)×(T) is equal to the required value.

According to a third characteristic of the present invention the third contact tank comprises a first system for controlling the injected quantity of ozone proportionally to the flow rate of the liquid to be treated, this control system being control-driven by a sensor measuring this flow rate, and a second system for controlling the injected quantity of hydrogen peroxide, which is a function of the flow rate of liquid being treated, this control system being control-driven by the said sensor, so that the mass ratio of hydrogen peroxide/ozone is maintained at a predetermined value.

According to the present invention each of the contact tanks or any one thereof may comprise means for partitioning such as especially partitions, baffles and the like, their number and arrangement being chosen so as to allow plug flow through the tank in question to be established.

BRIEF DESCRIPTION OF THE FIGURE

Other characteristics and advantages of the present invention will emerge from the description given below with reference to the attached drawing, in which the single figure is a diagrammatic illustration of a reactor produced according to the present invention.

DETAILED DESCRIPTION OF THE INVENTION

As stated above, a reactor according to the invention for the ozonization of water intended for human consumption comprises three contact tanks or towers arranged in series 1, 2 and 3 respectively.

The first contact tank 1 is intended for the direct and rapid oxidizing action by the ozone, the purpose of this first region being to respond to the momentary chemical ozone demand of the water to be treated. The water to be treated is delivered to this tank 1 by a pipe system 4 which incorporates a counting system 5 which makes it possible to control its flow rate.

Ozone is introduced into this first tank via a conduit 6, it being possible for this ozone injection to be carried out either in the form of a gas mixture or in the form of a concentrated ozone solution. The duration of contact of the water to be treated and of the ozone in this first tank is determined essentially by the hydraulics of the system for producing contact, it being possible for this contact time to range from a few seconds to two minutes. At the exit of this first tank the ozone concentrate on (C) in the liquid to be treated reaches the predetermined value which is required with a view to the disinfection.

This first tank comprises a regulating system 8 making it possible to control the quantity of ozone which must be injected into the first tank 1, this control being performed starting with the measurement of the ozone concentration obtained with the aid of a sensor 7.

The second contact region 2 is intended to ensure the disinfection of the liquid. This contact region receives the liquid to be treated originating from the first tank 1, the ozone concentration in this liquid to be treated exhibiting the value predetermined with a view to its disinfection, as specified above. The quantity of ozone which is introduced into this second tank via a pipe system 9, in the form of a gas mixture or in the form of a concentrated ozone mixture, is determined so as to maintain in the liquid to be treated the ozone concentration (C) necessary for good disinfection of the water. This second contact tank 2 comprises a system 11 for controlling the quantity of ozone which must be injected therein. This control is performed starting with the measurement of the ozone at the exit of this tank 2, obtained with the aid of a sensor 10. The contact time (T) between the liquid to be treated and the ozone is determined so as to obtain a product $(C) \times (T)$ that is suitable for the required purpose.

The third contact tank 3 is intended to ensure the radical action of the ozone, this tank comprising an introduction of hydrogen peroxide. The contact time in this tank is determined as a function of the pollutants to be removed, taking into account their nature, their concentration and the required result at the same time. This region comprises an ozone injection 12, in a quantity which depends on the same factors. In the same way as in the preceding tanks, the ozone may be injected either in the form of a gas mixture or in the form of a concentrated ozone solution. The quantity of ozone is introduced proportionally to the flow rate being treated. The tank 3 therefore comprises a regulating system 13 controlling this quantity of ozone which is introduced as a function of the measurement of the flow rate of the fluid to be treated 4, obtained by the counting system 5.

The hydrogen peroxide is introduced into the tank 3 by means of a conduit 14, the quantity of hydrogen peroxide thus introduced making it possible to increase the quantity of OH radicals available for the reaction with the pollutants to be oxidized. The reaction of hydrogen peroxide with the ozone in tank 3 reduces the ozone concentration to a level such that the control of the ozone injected using the measurement of the measured content is unrealistic and unreliable. Consequently, and according to the present invention, the quantity of hydrogen peroxide injected into the tank 3 via the conduit 14 is controlled proportionally to the flow rate being treated. The tank therefore comprises a control system 15 which is control-driven by the measurement of the flow rate of the water to be treated, this measurement being obtained starting with the counting system 5. The control of the quantity of peroxide which is thus injected is carried out so that the mass ratio of hydrogen peroxide/ozone is maintained at all times at a value predetermined in the laboratory.

The treated water is discharged from the third tank 3 at 16. This water is completely disinfected and now contains only a hydrogen peroxide concentration which is lower than that required by the statutory provisions.

According to the present invention, each (or any one) of the contact tanks 1, 2, 3 may comprise partitioning systems such as partitions, baffles 17 or the equivalent, the number and the arrangement of which are chosen so as to obtain plug flow through the tank in question.

It remains to be said, of course, that the present invention is not limited to the embodiments described and/or illustrated here, but that it includes all the alternative forms.

I claim:

1. A method for achieving ozonation of water for human consumption, utilizing at least three treatment zones implemented by corresponding serially connected contact tanks and comprising the steps:

introducing a regulated quantity of ozone directly into the water received in the first contact tank, thereby achieving rapid oxidizing action by the ozone;

sensing residual ozone concentration (C) in the water as it passes between the first and second contact tanks;

regulating the quantity of ozone introduced into the first contact tank, in response to sensed residual ozone concentration, to achieve a level necessary for disinfection of the water;

sensing the residual ozone concentration in the water as it passes between the second and third contact tanks;

introducing a regulated quantity of ozone directly into the water received in the second contact tank, in response to the residual ozone concentration (C) sensed in the water flowing between the second and third tanks, the concentration ((2) being sufficient to disinfect the water;

the contact time (T) of the ozone and water in the second contact tank being determined so that the product $C \times T$ is equal to a predetermined value necessary to achieve the disinfection;

measuring the flow rate of water introduced into the first contact tank;

introducing a regulated additional quantity of ozone directly into the water received in the third contact tank, in response to the measured flow rate, and in sufficient quantity to sustain residual ozone concentration necessary for the disinfection of the water, the ozone introduced in a flow direction orthogonal to the flow of water received in the third tank;

regulating a quantity of hydrogen peroxide introduced into the third contact tank, in response to the measured flow rate introduced prior to the ozone introduced to the third tank, and having a flow direction coincident with the water introduced into the third tank, the hydrogen peroxide increasing the quantity of OH radicals available for reaction with pollutants to be oxidized, wherein the mass ratio of hydrogen peroxide/ozone is maintained at a preselected value; and discharging the water as finally treated in the third contact tank.

2. A reactor for water ozonation comprising:

at least three treatment zones implemented by corresponding serially connected contact tanks;

a first contact tank receiving water to be treated;

means for introducing a regulated quantity of ozone directly into the water received in the first contact tank, thereby achieving rapid oxidizing action by the ozone;

a second contact tank serially connected to the outlet of the first contact tank for receiving water treated in the first contact tank;

means for sensing the residual ozone concentration in the water as it passes between the first and second contact tanks;

regulating means, responding to sensed residual ozone concentration, for regulating the quantity of ozone introduced into the first contact tank to achieve a level necessary for disinfection of the water;

means for introducing a regulated quantity of ozone directly into the water received in the second contact tank, to achieve a level necessary for disinfection of the water;

a second means for sensing the residual ozone concentration in the water as it passes between the second and third contact tanks:

regulating means, responding: to residual ozone concentration (C) sensed by the second sensing means, for controlling the quantity of ozone introduced into the second contact tank;

the contact time (T) of the ozone and water in the second contact tank being determined so that the product C×T is equal to a predetermined value necessary to achieve disinfection of the water;

a third contact tank serially connected to the outlet of the second contact tank for receiving water treated in the second contact tank;

means for introducing a regulated additional quantity of ozone directly into the water received in the third contact tank, in sufficient quantity to sustain residual ozone concentration necessary for the disinfection of the water, and in a flow direction orthogonal to the flow of water received in the third tank;

means for measuring the flow rate of water introduced into the first contact tank;

regulation means, responding to the measured flow rate, for controlling the quantity of ozone introduced into the third contact tank; and regulation means, responding to the measured flow rate, for regulating a quantity of hydrogen peroxide introduced into the third contact tank, prior to the ozone introduced to the third tank, and in a flow direction coincident with the water introduced into the third tank, the hydrogen peroxide increasing the quantity of OH radicals available for reaction with pollutants to be oxidized, and wherein the mass ratio of hydrogen peroxide/ozone is maintained at a preselected value; and means for discharging the water as finally treated in the third contact tank.

* * * * *